United States Patent [19]

Gitzel et al.

[11] Patent Number: 5,401,809
[45] Date of Patent: Mar. 28, 1995

[54] POLYMER AMMONIUM BORATES AND PROCESSES FOR THEIR PREPARATION

[75] Inventors: Jörg Gitzel, Waldems; Detlef Wehle, Niedernhausen; Hans-Tobias Macholdt, Darmstadt, all of Germany

[73] Assignee: Hoechst Aktiengesellschaft, Frankfurt, Germany

[21] Appl. No.: 162,832

[22] Filed: Dec. 3, 1993

Related U.S. Application Data

[63] Continuation of Ser. No. 761,403, Sep. 17, 1991, abandoned.

[30] Foreign Application Priority Data

Sep. 19, 1990 [DE] Germany .................. 40 29 652.0

[51] Int. Cl.⁶ .................................................. C08F 8/42
[52] U.S. Cl. .................................... 525/337; 430/110; 525/328.2; 525/328.3; 525/360; 526/239; 526/310; 526/923
[58] Field of Search ............ 525/328.2, 328.3, 337; 430/110; 526/239, 328.2, 328.3

[56] References Cited

U.S. PATENT DOCUMENTS 3,288,770 11/1966 Butler .
3,893,935 7/1975 Jadwin ..................... 252/62.1
3,970,571 7/1976 Olson ........................ 430/110
4,452,957 6/1984 Neigel ........................ 526/71
4,684,596 8/1987 Bonser ....................... 430/110
4,801,359 1/1989 Jeanne ....................... 204/1 T
4,937,294 6/1990 Carobbi et al. ............. 525/329.1

FOREIGN PATENT DOCUMENTS 0103698 3/1984 European Pat. Off. .

*Primary Examiner*—Fred Zitomer
*Attorney, Agent, or Firm*—Connolly and Hutz

[57] ABSTRACT

Polymer ammonium borates having a molecular weight from about 5000 to about 500,000 and obtained by homopolymerization of monomers, such as, for example, diallyldialkylammonium chloride, and by copolymerization of mixtures of two monomers, such as, for example, diallyldimethylammonium chloride and diallylmethyloctylammonium chloride, having molar monomer ratios of about 0.5:0.5 to about 0.95:0.05 in the copolymer, followed, if desired, by anion exchange, and mixtures of these compounds. Polymer ammonium borates according to the invention are suitable as colorless charge-control agents in toners and developers for electrophotographic recording processes and as charge-improving agents in powders and coatings for surface coating.

7 Claims, No Drawings

POLYMER AMMONIUM BORATES AND PROCESSES FOR THEIR PREPARATION

This application is a continuation of application Ser. No. 07/761,403, filed Sep. 17, 1991, now abandoned.

The present invention relates to polymer ammonium borates based on homopolymer or copolymer poly(diallylammonium) derivatives and copolymers of poly(diallylammonium) derivatives with selected vinyl compounds. The present invention specifically relates to new polymer ammonium borates which have a molecular weight from about 5000 to about 500,000, are based on poly(diallylammonium) derivatives or copolymers thereof, have molar monomer ratios of (I):(II) and (I):(III) and (II):(III) of about 0.5:0.5 to about 0.95:0.05 in the copolymer and are prepared by homopolymerization of monomers of the formula (I) or (II) and by copolymerization of mixtures of two monomers of the formulae (I) to (III), followed, if desired, by anion exchange

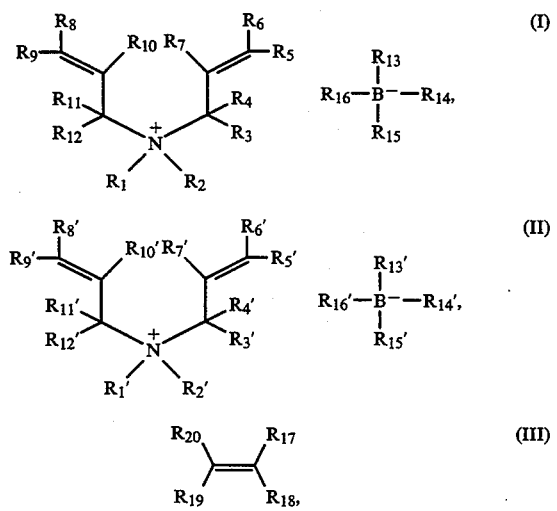

in which the radicals $R_1$ to $R_{16}$ and $R_1'$ to $R_{16}'$, independently of one another, are each a hydrogen atom, halogen atom, a hydroxyl radical, a primary, secondary or tertiary amino radical, a carboxyl or carboxylic ester radical, a sulfo or sulfonic ester radical, a cyano or nitro radical or are each a radical based on a hydrocarbon which may be interrupted by heteroatoms, and the radicals $R_{17}$ to $R_{20}$, independently of one another, are each a hydrogen atom, chlorine atom, bromine atom, a hydroxyl radical, a primary, secondary or tertiary amino radical, a carboxyl or carboxylic ester radical, a sulfo or sulfonic ester radical, a cyano or nitro radical or are each a radical based on a hydrocarbon which may be interrupted by heteroatoms, in which $R_1$ and $R_2$ or $R_1'$ and $R_2'$, independently of one another, are hydrogen atoms, straight-chain or branched, saturated or unsaturated alkyl($C_1$-$C_{18}$) or alkoxy($C_1$-$C_{18}$) radicals, polyoxyalkylene radicals, preferably polyoxyethylene and polyoxypropylene radicals, of the formula —(alkylene($C_1$-$C_5$)—O)$_n$—R, in which R is a hydrogen atom, an alkyl($C_1$-$C_4$) radical or an aryl radical, such as, for example, an acetyl, benzoyl or naphthoyl radical, and n is a number from 1 to 10, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, or cycloalkyl radicals, such as, for example, cyclopentyl or cyclohexyl radicals, and $R_1$ and $R_2$ or $R_1'$ and $R_2'$ can also form a saturated or unsaturated, aromatic or non-aromatic 5- to 7-membered ring system, such as, for example, a pyridinium ring system, which may contain further heteroatoms, preferably nitrogen and/or oxygen and/or sulfur atoms, such as, for example, a morpholinium ring system, and may be substituted and/or modified by fusing or bridging to give further ring systems, such as, for example, a quinolinium ring system, in which the radicals $R_1$ and $R_2$ or $R_1'$ and $R_2'$ may contain one or more heteroatoms, such as, for example, nitrogen and/or oxygen and/or sulfur and/or phosphorus atoms and may be substituted by halogen atoms, hydroxyl, carboxyl, sulfo, cyano, mercapto radicals, carboxamide radicals, such as, for example, —NH—C(O)-alkyl($C_1$-$C_4$), sulfonamide radicals, such as, for example, —NH—SO$_2$-alkyl($C_1$-$C_4$), urethane radicals, such as, for example, —NH—C(O)O-alkyl($C_1$-$C_4$), keto radicals, such as, for example, —C(O)-alkyl($C_1$-$C_4$), primary, secondary or tertiary amino radicals, such as, for example, —NH[alkyl-($C_1$-$C_4$)], —N[alkyl($C_1$-$C_{30}$)]$_2$, nitro radicals, ether radicals, such as, for example, -alkylene($C_1$-$C_4$)—O-alkyl-($C_1$-$C_4$), alkyl($C_1$-$C_{30}$), alkoxy($C_1$-$C_{30}$), aroxy radicals as, for example, phenoxy radicals, haloalkyl($C_1$-$C_{30}$), haloalkoxy($C_1$-$C_{30}$) or ester radicals, such as, for example, —C(O)O-alkyl($C_1$-$C_4$), and the radicals $R_3$ to $R_{12}$ or $R_3'$ to $R_{12}'$, independently of one another, are hydrogen atoms, halogen atoms, straight-chain or branched, saturated or unsaturated alkyl($C_1$-$C_{18}$) or alkoxy($C_1$-$C_{18}$) radicals, polyoxyalkylene radicals, preferably polyoxyethylene and polyoxypropylene radicals, of the formula —(alkylene($C_1$-$C_5$)—O)$_n$—R, in which R is a hydrogen atom, an alkyl($C_1$-$C_4$) radical or an acyl radical, such as, for example, an acetyl, benzoyl or naphthoyl radical, and n is a number from 1 to 10, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, aroxy radicals, such as, for example, phenoxy radicals, alkaryl radicals, such as, for example, benzyl radicals, or cycloalkyl radicals, such as, for example, cyclopentyl or cyclohexyl radicals, and two of the radicals $R_3$ to $R_{12}$ or $R_3'$ to $R_{12}'$ can also form a saturated or unsaturated, aromatic or non-aromatic 5-to 7-membered ring system, such as, for example, a pyridinium ring system, which may contain further heteroatoms, preferably nitrogen and/or oxygen and/or sulfur atoms, such as, for example, a morpholinium ring system, and may be substituted and/or modified by fusing or bridging to give further ring systems, such as, for example, a quinolinium ring system, in which the radicals $R_3$ to $R_{12}$ or $R_3'$ to $R_{12}'$ may contain one or more hetero atoms, such as, for example, nitrogen and/or oxygen and/or sulfur and/or phosphorus atoms, and may be substituted by halogen atoms, hydroxyl, carboxyl, sulfo, cyano, mercapto radicals, carboxamide radicals, such as, for example, —NH—C(O)-alkyl(-$C_1$-$C_4$), sulfonamide radicals, such as, for example, —NH—SO$_2$-alkyl($C_1$-$C_4$), urethane radicals, such as, for example, —NH—C(O)O-alkyl($C_1$-$C_4$), keto radicals, such as, for example, —C(O)-alkyl($C_1$-$C_4$), primary, secondary or tertiary amino radicals, such as, for example, —NH[alkyl($C_1$-$C_4$)], —N[alkyl($C_1$-$C_4$)]$_2$, nitro radicals, ether radicals, such as, for example, -alkylene($C_1$-$C_4$)—O-alkyl($C_1$-$C_4$), alkyl($C_1$-$C_{30}$), alkoxy($C_1$-$C_{30}$), aroxy radicals, such as, for example, phenoxy radicals, haloalkyl($C_1$-$C_{30}$), haloalkoxy($C_1$-$C_{30}$) radicals or ester radicals, such as, for example, —C(O)O-alkyl($C_1$-$C_4$), and the radicals $R_{13}$ to $R_{16}$ or $R_{13}'$ to $R_{16}'$ on the borate anion are, independently of one another, aliphatic, cycloaliphatic radicals, aryl or heteroaryl or aralkyl radicals, it being possible for these radicals to be substituted by alkyl($C_1$-$C_4$), alkoxy($C_1$-$C_4$), aryl radicals or halogen atoms, or are fluorine atoms, and the radicals $R_{17}$ to $R_{20}$, independently of one another, are hydrogen atoms, chlorine atoms, bromine atoms, straight-chain or branched, saturated or unsaturated alkyl($C_1$-$C_{30}$) radicals, polyoxyalkylene radicals, preferably polyoxyethylene and polyoxypropylene radicals, of the formula —(alkylene($C_1$-$C_5$)—O)$_n$—R, in which R is a hydrogen atom, an alkyl($C_1$-$C_4$) radical or an acyl radical, such as, for example, an acetyl, benzoyl or naphthoyl radical, and n is a number from 1 to 10, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, or cycloalkyl radicals, such as, for example, cyclopentyl or cyclohexyl radicals, carboxyl, sulfo, cyano radicals, carboxamide radicals, such as, for example, —NH—C(O)-alkyl($C_1$-$C_4$), sulfonamide radicals, such as, for example, —NH—SO$_2$-alkyl($C_1$-$C_4$), ester radicals, such as, for example, —CO(O)-alkyl($C_1$-$C_4$), carboxylate radicals, such as, for example, —O—C(O)-alkyl($C_1$-$C_4$), keto radicals, such as, for example, —C(O)-alkyl($C_1$-$C_4$), lactam radicals, such as, for example,

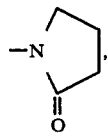

or ether radicals, such as, for example, -alkylene($C_1$-$C_4$)—O-alkyl($C_1$-$C_4$), in which the radicals $R_{17}$ to $R_{20}$ may contain one or more hetero atoms, such as, for example, nitrogen and/or oxygen and/or sulfur and/or phosphorus atoms, and may be substituted by chlorine or bromine atoms, hydroxyl, c arboxyl or sulfo, cyano, mercapto radicals, carboxamide radicals, such as, for example, —NH—C(O)-alkyl($C_1$-$C_4$), sulfonamide radicals, such as, for example, —NH—SO$_2$-alkyl($C_1$-$C_4$), primary, secondary or tertiary amino radicals, such as, for example, —NH[alkyl($C_1$-$C_4$)], —N[alkyl($C_1$-$C_4$)]$_2$, or nitro radicals, and in the case of homopolymerization of monomers of the formula (I) or (II) $R_1$ and $R_2$ and/or $R_1'$ and $R_2'$ may be identical or different, and in the case of copolymerization of mixtures of two monomers of the formulae (I) to (III) not only the radicals $R_1$ and $R_2$ and/or $R_1'$ and $R_2'$ but also the borate anions may be identical or different and to mixtures of these compounds.

The invention relates in particular to polymer ammonium borates which have a molecular weight of about 20,000 to about 250,000, are based on poly(diallylammonium) derivatives and copolymers thereof, have molar monomer ratios of (I):(II) and (I):(III) and (II):(III) of about 0.5:0.5 to about 0.95:0.05 in the copolymer, and are prepared by homopolymerization of monomers of the above-mentioned formula (I) or (II) and by copolymerization of mixtures of two monomers of the abovementioned formulae (I) to (III), followed, if desired, by anion exchange, in which $R_1$ and $R_2$ or $R_1'$ and $R_2'$, independently of one another, are hydrogen atoms, straight-chain or branched, saturated or unsaturated alkyl($C_1$-$C_8$) or alkoxy($C_1$-$C_8$) radicals, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, or cycloalkyl radicals, such as, for example, cyclopentyl or cyclohexyl radicals, in which the radicals $R_1$ and $R_2$ or $R_1'$ and $R_2'$ may be substituted by halogen atoms, hydroxyl, carboxyl, sulfo radicals, carboxamide radicals, such as, for example, —NH—C(O)-alkyl($C_1$-$C_4$), sulfonamide radicals, such as, for example, —NH—SO$_2$-alkyl($C_1$-$C_4$), keto radicals, such as, for example, —C(O)-alkyl($C_1$-$C_4$), primary, secondary or tertiary amino radicals, such as, for example, —NH[alkyl-($C_1$-$C_4$)], —N[alkyl($C_1$-$C_4$)]$_2$, nitro radicals, ether radicals, such as, for example, -alkylene($C_1$-$C_4$)—O-alkyl-($C_1$-$C_4$), alkyl($C_1$-$C_4$), alkoxy($C_1$-$C_4$), aroxy radicals as, for example, phenoxy radicals, haloalkyl($C_1$-$C_4$), haloalkoxy($C_1$-$C_4$) radicals or ester radicals, such as, for example, —C(O)O-alkyl($C_1$-$C_4$), and the radicals $R_3$ to $R_{12}$ or $R_3'$ to $R_{12}'$, independently of one another, are hydrogen atoms, halogen atoms, straight-chain or branched, saturated or unsaturated alkyl($C_1$-$C_8$) or alkoxy($C_1$-$C_8$) radicals, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, aroxy radicals, such as, for example, phenoxy radicals, alkaryl radicals, such as, for example, benzyl radicals or cycloalkyl radicals, such as, for example, cyclopentyl or cyclohexyl radicals, in which the radicals $R_3$ to $R_{12}$ or $R_3'$ to $R_{12}'$ may be substituted by halogen atoms, hydroxyl, carboxyl, sulfo radicals, carboxamide radicals, such as, for example, —NH—C(O)-alkyl($C_1$-$C_4$), sulfonamide radicals, such as, for example, —NH—SO$_2$-alkyl($C_1$-$C_4$), keto radicals, such as, for example, —C(O)-alkyl($C_1$-$C_4$), primary, secondary or tertiary amino radicals, such as, for example, —NH[alkyl-($C_1$-$C_4$)], —N[alkyl($C_1$-$C_4$)]$_2$, nitro radicals, ether radicals, such as, for example, -alkylene($C_1$-$C_4$)—O-alkyl-($C_1$-$C_4$), alkyl($C_1$-$C_4$), alkoxy($C_1$-$C_4$), such as, for example, phenoxy radicals, haloalkyl($C_1$-$C_4$), haloalkoxy($C_1$-$C_4$) radicals or ester radicals, such as, for example, —C(O)O-alkyl($C_1$-$C_4$), and the radicals $R_{13}$ to $R_{16}$ or $R_{13}'$ to $R_{16}'$ are phenyl, naphthyl, fluorophenyl, chlorophenyl, methoxyphenyl, biphenyl, pyridyl, tolyl radicals or fluorine atoms, and the radicals $R_{17}$ to $R_{20}$, independently of one another, are hydrogen atoms, straight-chain or branched, saturated or unsaturated alkyl($C_1$-$C_8$) radicals, aryl or heteroaryl radicals, such as, for example, phenyl, naphthyl or pyridyl radicals, aralkyl radicals, such as, for example, tolyl radicals, aralkoxy radicals, such as, for example, methoxyphenyl radicals, alkaryl radicals, such as, for example, benzyl radicals, cycloalkyl radicals, such as, for example, cyclopentyl or cyclohexyl radicals, carboxyl, sulfo, cyano radicals, ester radicals, such as, for example, —C(O)O-alkyl($C_1$-$C_4$), carboxylate radicals, such as, for example, —O—C(O)-alkyl($C_1$-$C_4$), carboxamide radicals, such as, for example, —NH—C(O)-alkyl($C_1$-$C_4$), sulfonamide radicals, such as, for example, —NH—SO$_2$-alkyl($C_1$-$C_4$), keto radicals, such as, for example, —C(O)-alkyl($C_1$-$C_4$), lactam radicals, such as, for example,

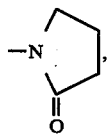

or ether radicals, such as, for example, -alkylene($C_1$-$C_4$)—O-alkyl($C_1$-$C_4$), in which the radicals $R_{17}$ to $R_{20}$ may be substituted by chlorine or bromine atoms, hydroxyl, carboxyl, sulfo, cyano, mercapto, carboxamide radicals, such as, for example, —NH—C(O)-alkyl(-$C_1$-$C_4$), sulfonamide radicals, such as, for example, —NH—$SO_2$-alkyl($C_1$-$C_4$), primary, secondary or tertiary amino radicals, such as, for example, —NH[alkyl-($C_1$-$C_4$)], —N[alkyl($C_1$-$C_4$)]$_2$, or nitro radicals, and to mixtures of these compounds and mixed crystals containing mixed anions and/or cations.

Examples of very particularly suitable compounds are:
homopolymers comprising

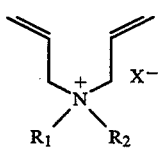

where $X^-$ is $BF_4^-$, B(phenyl)$_4^-$, $R_1$ is H, $CH_3$, $R_2$ is $CH_3$, $C_8H_{17}$ and having a molecular weight of about 20,000 to about 250,000,
copolymers comprising

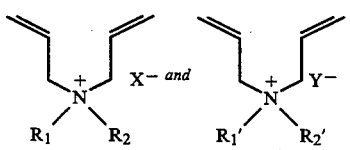

where $X^-$ and $Y^-$ are $BF_4^-$, B(phenyl)$_4^-$, $R_1$ and $R_1'$ are H, $CH_3$, $R_2$ and $R_2'$ are $CH_3$, $C_8H_{17}$, having a molecular weight of about 20,000 to about 250,000 and a molar monomer ratio in the copolymer of about 0.5:0.5 to about 0.95:0.05,
copolymers comprising

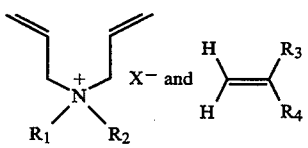

where $X^-$ and $Y^-$ are $BF_4^-$, B(phenyl)$_4^-$, $R_1$ is H, $CH_3$, $R_2$ is $CH_3$, $C_8H_{17}$, $R_3$ is H, $CH_3$, $R_4$ is COOH, C(O)OCH$_3$, C(O)OC$_2$H$_5$, C(O)NH$_2$, OC(O)CH$_3$, CN, and having a molecular weight of about 20,000 to about 250,000 and a molar monomer ratio in the copolymer of about 0.5:0.5 to about 0.95:0.05.

Examples of individual compounds are
a homopolymer comprising

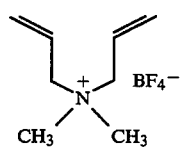

(1)

having a molecular weight of about 100,000,
a homopolymer comprising

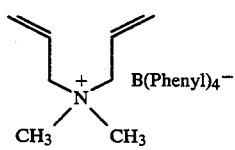

(2)

having a molecular weight of about 100,000,
a homopolymer comprising

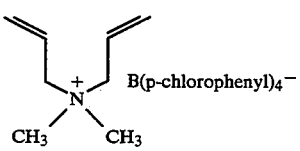

(3)

having a molecular weight of about 100,000,
a copolymer comprising

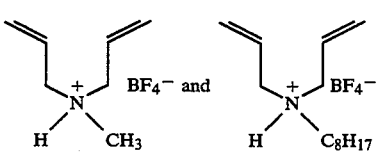

(4)

having a molecular weight of about 100,000 and a molar monomer ratio in the copolymer of about 0.8:0.2,
a copolymer comprising

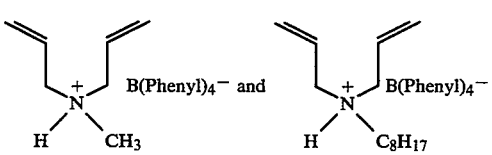

(5)

having a molecular weight of about 100,000 and a molar monomer ratio in the copolymer of about 0.8:0.2,
a copolymer comprising

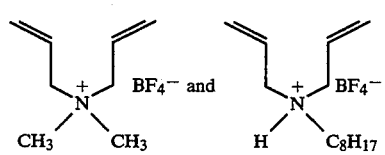

(6)

having a molecular weight of about 100,000 and a molar monomer ratio in the copolymer of about 0.8:0.2,
a copolymer comprising

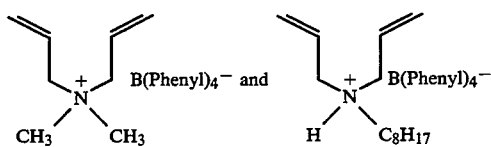 (7)

having a molecular weight of about 100,000 and a molar monomer ratio in the copolymer of about 0.8:0.2, a copolymer comprising

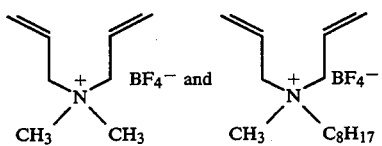 (8)

having a molecular weight of about 100,000 and a molar monomer ratio in the copolymer of about 0.95:0.05, a copolymer comprising

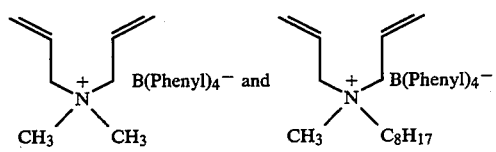 (9)

having a molecular weight of about 100,000 and a molar monomer ratio in the copolymer of about 0.95:0.05, a copolymer comprising

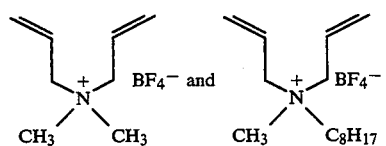 (10)

having a molecular weight of about 100,000 and a molar monomer ratio in the copolymer of about 0.8:0.2, a copolymer comprising

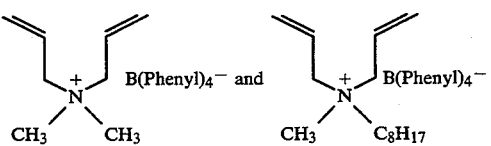 (11)

having a molecular weight of about 100,000 and a molar monomer ratio in the copolymer of about 0.8:0.2, a copolymer comprising

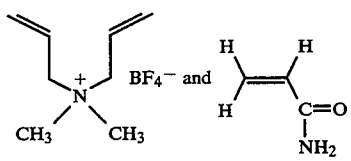 (12)

having a molecular weight of about 100,000 and a molar monomer ratio in the copolymer of about 0.8:0.2, a copolymer comprising

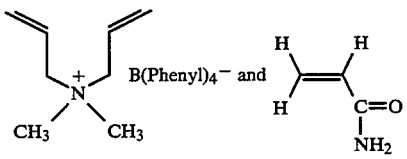 (13)

having a molecular weight of about 100,000 and a molar monomer ratio in the copolymer of about 0.8:0.2.

The compounds of the formula (I) to (III) and their homo or copolymers are prepared by reacting the homo- and copolymers of the compounds of the formulae (IV) to (VI) or reacting copolymers of mixtures of two monomers of the formulae (IV) to (VI)

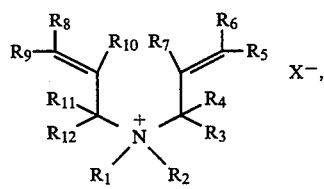 (IV)

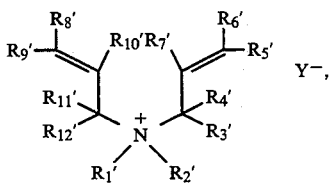 (V)

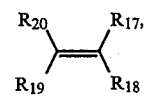 (VI)

in which the radicals $R_1$ to $R_{12}$, $R_1'$ to $R_{12}'$ and $R_{17}$ to $R_{20}$ have the meanings given in the formulae (I) to (III) and $X^-$ and $Y^-$, independently of one another, are halide, methylsulfate or ethylsulfate, with a borate salt. The preparation of the compounds of the formulae (IV) to (VI) is known and has been described in detail in the literature [e.g. G. B. Butler, R. J. Angelo, J. Am. Chem. Soc. 79 (1957), 3128-31; G. B. Butler in: E. J. Goethals, "Polymeric Amines and Ammonium Salts", Pergamon Press, 1980, 125-42; D. H. Solomon, D. G. Hawthorne, J. Macromol. Sci.-Rev. Macromol. Chem. C15 (1976), 143-64; HoubenWeyl, "Methoden der Organischen Chemie" (Methods of Organic Chemistry), Vol. XIV/1, Thieme-Verlag, Stuttgart, 1961, 561-1182; K. Weissermel, H. -J. Arpe, "Industrielle Organische Chemie" (Industrial Organic Chemistry), Verlag Chemie, Weinheim, 1988, 230-51; GDR Patent 127729; European Patent 0103698; U.S. Pat. No. 3,288,770]. Thus, the compounds of the formulae (IV) and (V) are prepared, for example by reacting allyl halides with N,N-dialkylallylamines or by reducing alkylnitriles, followed by reaction of the amine with allyl halides and quaternization of the diallylamine. Compounds of the formula (VI) are prepared, for example, by an addition reaction of hydrogen halides with ethyne, from ethylene chlorohydrin by reaction with NaCN and alcohols, by esterification of lactic acid followed by thermolysis, by reaction of ethene with acetic acid, by Friedel-Crafts alkylation of aromatics, followed by cracking, by oxidation of propene with ammonia or catalytic hydrolysis of acrylamide. Homopolymers of monomers of the formulae (IV) and (V) and copolymers of mixtures of two monomers of the formulae (IV) to (VI) are prepared, for example, by free-radical homo- or copolymerization under inert gas in polar solvents, such as, for example, water or dimethylformamide, by means of free-radical initiators, such as, for example, t-butyl hydroperoxide or ammonium peroxydisulfate, the preferred monomers used being the halide salts.

The various salts, for example of the compounds (1) to (13), are prepared by anion exchange using a borate salt, for example by precipitation from aqueous medium or mixtures of water and organic solvent, such as described in the preparation examples.

The polymer ammonium borates according to the invention are highly suitable for use as colorless charge-control agents in toners and developers for electrophotographic recording processes and for use as charge-improving agents in powders and coatings for surface coating, in particular in triboelectrically or electrokinetically sprayed powder coatings.

Charge control agents in toners and developers for electrophotographic recording processes are prepared by first preparing the polymer as disclosed in the following examples, then washing the prepared polymer chloride-free with water, and sufficiently drying the ion free polymer in a vacuum cabinet at elevated temperature. Temperatures in the vicinity of 100° C. are required to dry the ion free polymer thoroughly and thereby make the polymer suitable for use as a charge control agent.

The preparation examples which follow serve to illustrate the invention without limiting it thereto.

PREPARATION EXAMPLES

PREPARATION EXAMPLE 1

10 g (0.06 mol) of a homopolymer comprising diallyldimethylammonium chloride (molecular weight about 100,000 g/mol) are dissolved in 200 ml of water and 7.5 g (0.07 mol) of sodium tetrafluoroborate dissolved in 100 ml of water are slowly added dropwise at room temperature with stirring. The white precipitate is filtered off with suction, washed chloride-free with water and dried at 100° C. in a vacuum drying cabinet.

Yield: 12.2 g (92.4 % of theory) of the compound (1), white powder

Melting point: >300° C. (decomposition)

Elemental analysis calculated 45.1% C, 7.5% H, 6.6% N, 35.7% F found 44.5% C, 7.9% H, 6.5% N, 33.4% F

PREPARATION EXAMPLE 2

The procedure of Preparation Example 1 is repeated, except that 24.0 g (0.07 mol) of sodium tetraphenylborate dissolved in 150 ml of water are used instead of sodium tetrafluoroborate.

Yield: 27.2 g (98.7% of theory) of the compound (2), white powder

Melting point: 225° C.

Elemental analysis: calculated 86.3% C, 8.1% H, 3.1% N, 2.4% B found 84.2% C, 8.1% H, 3.4% N, 2.0% B

PREPARATION EXAMPLE 3

10 g (0.06 mol) of a copolymer comprising diallyldimethylammonium chloride and diallylmethyloctylammonium chloride (molecular weight about 100,000 g/mol, molar ratio of the monomer units in the copolymer about 0.8 to 0.2) are dissolved in 400 ml of water, and 7.5 g (0.07 mol) of sodium tetrafluoroborate dissolved in 100 ml of water are slowly added dropwise with stirring at room temperature. The white precipitate is filtered off with suction, washed chloride-free with water and dried at 100° C. in a vacuum drying cabinet.

Yield: 12.4 g (89.9% of theory) of the compound (6), white powder

Melting point: >300° C. (decomposition)

Elemental analysis: calculated 48.0% C, 8.0% H, 6.1% N, 33.0% F found 46.9% C, 8.2% H, 6.2% N, 32.7% F

PREPARATION EXAMPLE 4

The procedure of Preparation Example 3 is repeated, except that 24.0 g (0.07 mol) of sodium tetraphenylborate dissolved in 150 ml of water are used instead of sodium tetrafluoroborate.

Yield: 26.7 g (96.3% of theory) of the compound (7), white powder

Melting point: 205°–210° C.

Elemental analysis: calculated 86.2% C, 8.3% H, 3.0% N, 2.4% B found 85.6% C, 8.4% H, 3.3% N, 2.2% B

PREPARATION EXAMPLE 5

10 g (0.06 mol) of a copolymer comprising diallyldimethylammonium chloride and diallylmethyloctylammonium chloride (molecular weight about 100,000 g/mol, molar ratio of the monomer units in the copolymer about 0.95 to 0.05) are dissolved in 400 ml of water, and 7.5 g (0.07 mol ) of sodium tetrafluoroborate dissolved in 100 ml of water are slowly added dropwise with stirring at room temperature. The weakly amber—colored precipitate is filtered off with suction, washed chloride-free with water and dried at 100° C. in a vacuum drying cabinet.

Yield: 9.5 g (72.04 of theory) of the compound (8), weakly amber-colored powder

Melting point: 270° C. (decomposition)

Elemental analysis: calculated 46.0% C, 7.7% H, 6.4% N, 5.0% B found 45.5% C, 8.0% H, 6.7% N, 4.3% B

PREPARATION EXAMPLE 6

The procedure of Preparation Example 5 is repeated, except that 24.0 g (0.07 mol) of sodium tetraphenylborate dissolved in 150 ml of water are used instead of sodium tetrafluoroborate.

Yield: 25.8 g (95.6% of theory) of the compound (9), white powder

Melting point: 240° C.

Elemental analysis: calculated 86.3% C, 8.2% H, 3.1% N, 2.4% B found 85.7% C, 8.8% H, 3.0% N, 2.2% B

PREPARATION EXAMPLE 7

10 g (0.08 mol) of a copolymer comprising diallyldimethylammonium chloride and acrylamide (molecular weight about 100,000 g/mol, molar ratio of the monomer units in the copolymer about 0.8 to 0.2) are dissolved in 400 ml of water, and 9.9 g (0.09 mol) of sodium tetrafluoroborate dissolved in 200 ml of water are slowly added dropwise at room temperature with stirring. The white precipitate is filtered off with suction, washed chloride-free with water and dried at 100° C. in a vacuum drying cabinet.

Yield: 11.6 g (78.2% of theory) of the compound (12), white powder

Melting point: >300° C. (decomposition)

Elemental analysis: calculated 45.4% C, 7.5% H, 7.6% N, 4.8% B found 45.1% C, 7.7% H, 7.4% N, 4.3% B

PREPARATION EXAMPLE 8

The procedure of Preparation Example 2 is repeated, except that 33.6 g (0.07 mol) of sodium tetra-p-chlorophenylborate are used instead of sodium tetraphenylborate.

Yield: 26.8 g (74.3% of theory) of the compound (3), white powder

Melting point: 210° C.

Elemental analysis calculated 65.9% C, 5.5% H, 24.4% Cl, 1.9% B found 65.2% C, 5.7% H, 23.8% Cl, 1.8% B

We claim:

1. A polymeric ammonium borate having a molecular weight from about 5000 to about 500,000 and obtained by homopolymerization of monomers of the formula (I) or (II) and by copolymerization of mixtures of two monomers of the formula (I) to (III), having molar monomer ratios (I):(II) and (I):(III) and (II):(III) of about 0.5:0.5 to about 0.95:0.05 in the copolymer, followed, if desired, by anion exchange

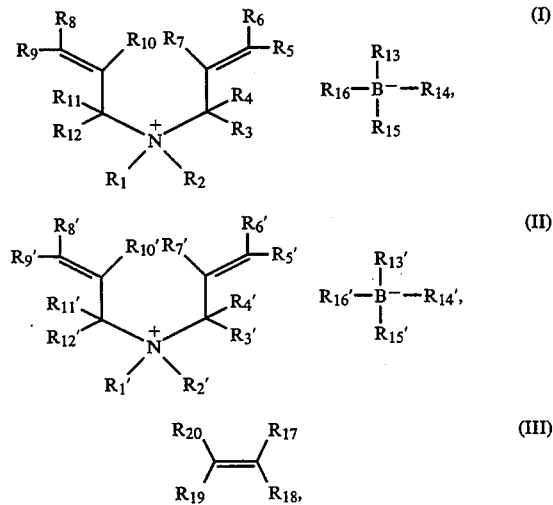

in which the radicals $R_1$ to $R_{16}$ and $R_1'$ to $R_{16}'$ independently of one another, are each a hydrogen atom, halogen atom, a hydroxyl radical, a primary, secondary or tertiary amino radical, a carboxyl or carboxylic ester radical, a sulfo or sulfonic ester radical, a cyano or nitro radical and the radicals $R_1$ and $R_2$ or $R_1'$ and $R_2'$, independently of one another and in addition to the meanings given above, are ether radicals, or form a saturated or unsaturated, aromatic or non-aromatic 5- to 7-membered ring, which optionally contains further nitrogens oxygen or sulfur atoms or a combination of said atoms and the radicals $R_3$ to $R_{12}$ or $R_3'$ to $R_{12}'$, independently of one another and in addition to the meanings given above, are polyoxyalkylene radicals of the formula —(alkylene ($C_1$-$C_5$)—O)$_n$—R, in which R is a hydrogen atom, an alkyl ($C_1$-$C_4$) radical or an acyl radical and n is a number from 1 to 10, and the radicals $R_{13}$ to $R_{16}$ or $R_{13}'$ to $R_{16}'$, independently of one another and in addition to the meanings given above, are aliphatic or cycloaliphatic radicals, aryl or heteroaryl or aralkyl radicals optionally being substituted by alkyl ($C_1$-$C_4$), alkoxy ($C_1$-$C_4$), aryl radicals or halogen atoms, and the radicals $R_{17}$ to $R_{20}$, independently of one another, are each a hydrogen atom, chlorine atom, bromine atom, a hydroxyl radical, a primary, secondary or tertiary amino radical, a carboxyl or carboxylic ester radical, a sulfo or sulfonic ester radical, a cyano or nitro radical or are each a polyoxyalkylene radical of the formula —(alkylene ($C_1$-$C_5$)—O)$_n$—R, in which R is a hydrogen atoms an alkyl ($C_1$-$C_4$) radical or an acyl radical and n is a number from 1 to 10, and the mixtures of these compounds washed chloride free and dried whereby charge control in a toner and a developer for an electrophotographic recording process, and charge improvement in powders and surface coatings is achieved.

2. A polymeric ammonium borate as claimed in claim 1, wherein the radicals $R_1$ and $R_2$ or $R_1'$ and $R_2'$, independently of one another, are hydrogen atoms, straight-chain or branched, saturated or unsaturated alkyl ($C_1$-$C_{18}$), alkoxy ($C_1$-$C_{18}$) radicals, polyoxyalkylene radicals, of the formula —(alkylene ($C_1$-$C_5$)—O)$_n$—R, in which R is a hydrogen atom, an alkyl ($C_1$-$C_4$) radical or an acyl radical, and n is a number from 1 to 10, aryl or heteroaryl radicals, aralkyl, aralkoxy, alkaryl or cycloalkyl radicals, and $R_1$ and $R_2$ or $R_1'$ and $R_2'$, can also form a saturated or unsaturated, aromatic or non-aromatic 5- to 7-membered ring system, which optionally contains further nitrogen, oxygen or sulfur atoms or a combination of said atoms, or is optionally substituted and/or modified by fusing or bridging to give a quinolinium ring system, in which the radicals $R_1$ and $R_2$ or $R_1'$ and $R_2'$ may contain one or more nitrogen, oxygen, sulfur or phosphorus atoms or a combination of said atoms and are optionally substituted by halogen atoms, hydroxyl, carboxyl, sulfo, cyano, mercapto, carboxamide, sulfonamide, urethane, keto radicals, primary, secondary or tertiary amino radicals, nitro, ether, alkyl ($C_1$-$C_{30}$), alkoxy ($C_1$-$C_{30}$), aroxy, haloalkyl ($C_1$-$C_{30}$), haloalkoxy ($C_1$-$C_{30}$) or ester radicals.

3. A polymeric ammonium borate as claimed in claim 1, wherein the radicals $R_3$ to $R_{12}$ or $R_3'$ and $R_{12}'$, independently of one another, are hydrogen atoms, halogen atoms, straight-chain or branched, saturated or unsaturated alkyl ($C_1$-$C_{18}$), alkoxy ($C_1$-$C_{18}$) radicals, polyoxyalkylene radicals of the formula —(alkylene ($C_1$-$C_5$)—O)$_n$—R, in which R is a hydrogen atom, an alkyl ($C_1$-$C_4$) radical or an acyl radical, and n is a number from 1 to 10, aryl or heteroaryl radicals, aralkyl, aralkoxy, aroxy, alkaryl or cycloalkyl radicals, and two of the radicals $R_3$ to $R_{12}$ or $R_3'$ to $R12'$, can also form a saturated or unsaturated, aromatic or non-aromatic 5- to 7-membered ring system, which optionally contains further nitrogen, oxygen or sulfur atoms or a combination of said atoms, or is optionally substituted and/or modified by fusing or bridging to give a quinolinium ring system, in which the radicals $R_3$ and $R_{12}$ or $R_3'$ and $R_{12}'$ optionally contain one or more nitrogen, oxygen, sulfur or phosphorus atoms or a combination of said atoms, and are optionally substituted by halogen atoms, hydroxyl, carboxyl, sulfo, cyano, mercapto, carboxamide, sulfonamide, urethane, keto radicals, primary, secondary or tertiary amino radicals, nitro, ether, alkyl ($C_1$-$C_{30}$), alkoxy ($C_1$-$C_{30}$), aroxy, haloalkyl ($C_1$-$C_{30}$), haloalkoxy ($C_1$-$C_{30}$) or ester radicals.

4. A polymeric ammonium borate as claimed in claim 1, wherein the radicals $R_{13}$ to $R_{16}$ or $R_{13}'$ to $R_{16}'$ on the borate anion are, independently of one another, aliphatic, cycloaliphatic radicals, aryl or heteroaryl radicals or aralkyl radicals, it being possible for these radicals to be substituted by alkyl($C_1$-$C_4$), alkoxy ($C_1$-$C_4$), aryl radicals or halogen atoms, or are fluorine atoms.

5. A polymeric ammonium borate as claimed in claim 1, wherein in the case of homopolymerization of monomers of the formula (I) or (II) $R_1$ and $R_2$ and/or $R_1'$ and $R_2'$ can be identical or different and in the case of copolymerization of mixtures of two monomers of the formulae (I) to (III) not only the radicals $R_1$ and $R_2$ and/or $R_1'$ and $R_2'$ but also the borate anions can be identical or different.

6. A polymeric ammonium borate as claimed in claim 1, wherein in the formulae (I) to (III) mentioned in claim 1 the radicals $R_1$ and $R_2$ or $R_1'$ and $R_2'$, independently of one another, are hydrogen atoms, alkyl-($C_1$-$C_8$), cyclopentyl, cyclohexyl, phenyl, naphthyl, pyridyl, benzyl, tolyl or methoxyphenyl radicals, the radicals are optionally substituted by halogen atoms, hydroxyl, cyano, mercapto radicals, primary, secondary or tertiary amino radicals or nitro radicals, and the radicals $R_3$ to $R_{12}$ or $R_3'$ to $R_{12}'$ independently of one another, are hydrogen atoms, halogen atoms, alkyl ($C_1$-$C_8$), cyclopentyl, cyclohexyl, phenyl, naphthyl, pyridyl, benzyl, tolyl or methoxyphenyl radicals, the radicals are optionally substituted by halogen atoms, hydroxyl, cyano, mercapto radicals, primary, secondary or tertiary amino radicals or nitro radicals, and the radicals $R_{13}$ to $R_{16}$ or $R_{13}'$ to $R_{16}'$ on the borate anion are phenyl, naphthyl, tolyl radicals or fluorine atoms, and the radicals $R_{17}$ to $R_{20}$, independently of one another, are hydrogen atoms, cyano, alkyl ($C_1$-$C_8$), cyclopentyl, cyclohexyl, phenyl, naphthyl, pyridyl, benzyl, tolyl, methoxyphenyl, carboxyl, sulfo, carboxamide, sulfonamide, ester or lactam radicals, the radicals are optionally substituted by chlorine or bromine atoms, hydroxyl, cyano, mercapto radicals, primary, secondary or tertiary amino radicals or nitro radicals.

7. A homopolymer comprising

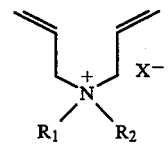

where $X^-$ is $BF_4^-$, $B(phenyl)_4^-$, $R_1$ is H, $CH_3$, $R_2$ is $CH_3$, $C_8H_{17}$ having a molecular weight of about 20,000 to about 250,000.

* * * * *